(12) United States Patent
Sivapurapu et al.

(10) Patent No.: US 11,776,193 B1
(45) Date of Patent: Oct. 3, 2023

(54) GRANULAR MOTION CONTROL FOR A VIRTUAL AGENT

(71) Applicant: Apple Inc., Cupertino, CA (US)

(72) Inventors: Siva Chandra Mouli Sivapurapu, Santa Clara, CA (US); Aashi Manglik, Sunnyvale, CA (US); Edward S. Ahn, San Francisco, CA (US); Mark Drummond, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 70 days.

(21) Appl. No.: 17/215,115

(22) Filed: Mar. 29, 2021

Related U.S. Application Data

(60) Provisional application No. 63/016,809, filed on Apr. 28, 2020.

(51) Int. Cl.
*G06T 13/80* (2011.01)
*G06T 7/246* (2017.01)
*G06T 13/40* (2011.01)

(52) U.S. Cl.
CPC .............. *G06T 13/80* (2013.01); *G06T 7/251* (2017.01); *G06T 13/40* (2013.01); *G06T 2207/20081* (2013.01); *G06T 2207/20084* (2013.01); *G06T 2207/30241* (2013.01)

(58) Field of Classification Search
CPC .......... G06T 13/80; G06T 7/251; G06T 13/40
See application file for complete search history.

(56) References Cited

U.S. PATENT DOCUMENTS

| | | | |
|---|---|---|---|
| 2012/0056800 A1* | 3/2012 | Williams | G06V 40/103 345/156 |
| 2016/0026253 A1* | 1/2016 | Bradski | H04N 13/128 345/8 |
| 2018/0165864 A1* | 6/2018 | Jin | G06F 3/0346 |

OTHER PUBLICATIONS

Anderson, Fraser, et al. "YouMove: enhancing movement training with an augmented reality mirror." 2013, Proceedings of the 26th annual ACM symposium on User interface software and technology. 2013, pp. 311-320 (Year: 2013).*

* cited by examiner

*Primary Examiner* — Peter Hoang
(74) *Attorney, Agent, or Firm* — Fernando & Partners, LLP

(57) ABSTRACT

Various implementations disclosed herein include devices, systems, and methods for granular motion control for a virtual agent. In various implementations, a device includes a non-transitory memory and one or more processors coupled with the non-transitory memory. In some implementations, a method includes obtaining an action for a virtual agent. In some implementations, the action is associated with a plurality of time frames. In some implementations, the method includes, for a first time frame of the plurality of time frames, determining respective confidence scores for a plurality of granular motions that advance the virtual agent towards completion of the action. In some implementations, the method includes selecting a subset of the plurality of granular motions based on the respective confidence scores.

24 Claims, 14 Drawing Sheets

| Animate the virtual agent to exhibit the subset of the plurality of granular motions during the first time frame | —308 |

Forecast respective effects of the plurality of granular motions on a number of subsequent time frames; and
Determine the respective confidence scores based on the respective effects —310

Determine whether at least one of the plurality of granular motions is available for selection during each of the number of subsequent time frames —312

Determine respective probabilities of advancing towards completion of the action —314

Select, from the plurality of granular motions, a set of one or more granular motions with confidence scores that satisfy a threshold —316

A supervisor network determines the respective confidence scores and selects the subset of the plurality of granular motions based on the respective confidence scores —318

Train the supervisor network independent of granular motion networks —320

Utilize reinforcement learning to train the supervisor network —322

Concurrently train the supervisor network in two or more environments —324

Train the granular motion networks independent of the supervisor network —326

Figure 3B

| Obtain joint movement values from a corresponding granular motion network, and
Apply the joint movement values to virtual joints of the virtual agent in order to exhibit the granular motion | ——328 |

| Provide current joint positions of the virtual joints to the corresponding granular motion network as an input, and
Receive, from the corresponding granular motion network, the joint movement values as a function of the current joint positions of the virtual joints | ——330 |

| Provide current joint trajectories of the virtual joints to the corresponding motion network as an input, and
Receive, from the corresponding granular motion network, the joint movement values as a function of the current joint trajectories of the virtual joints | ——332 |

| The joint movement values includes torque values for the virtual joints of the virtual agent | ——334 |

| Obtain the action from a rendering pipeline of the virtual agent | ——336 |

Figure 3C

GRANULAR MOTION CONTROL FOR A VIRTUAL AGENT

CROSS-REFERENCE TO RELATED APPLICATION

This application claims the benefit of U.S. Provisional Patent App. No. 63/016,809, filed on Apr. 28, 2020, which is incorporated by reference in its entirety.

TECHNICAL FIELD

The present disclosure generally relates to granular motion control for a virtual agent.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 3A-3C are flowchart representations of a method of providing granular motion control for a virtual agent in accordance with some implementations.

Figure 1A:
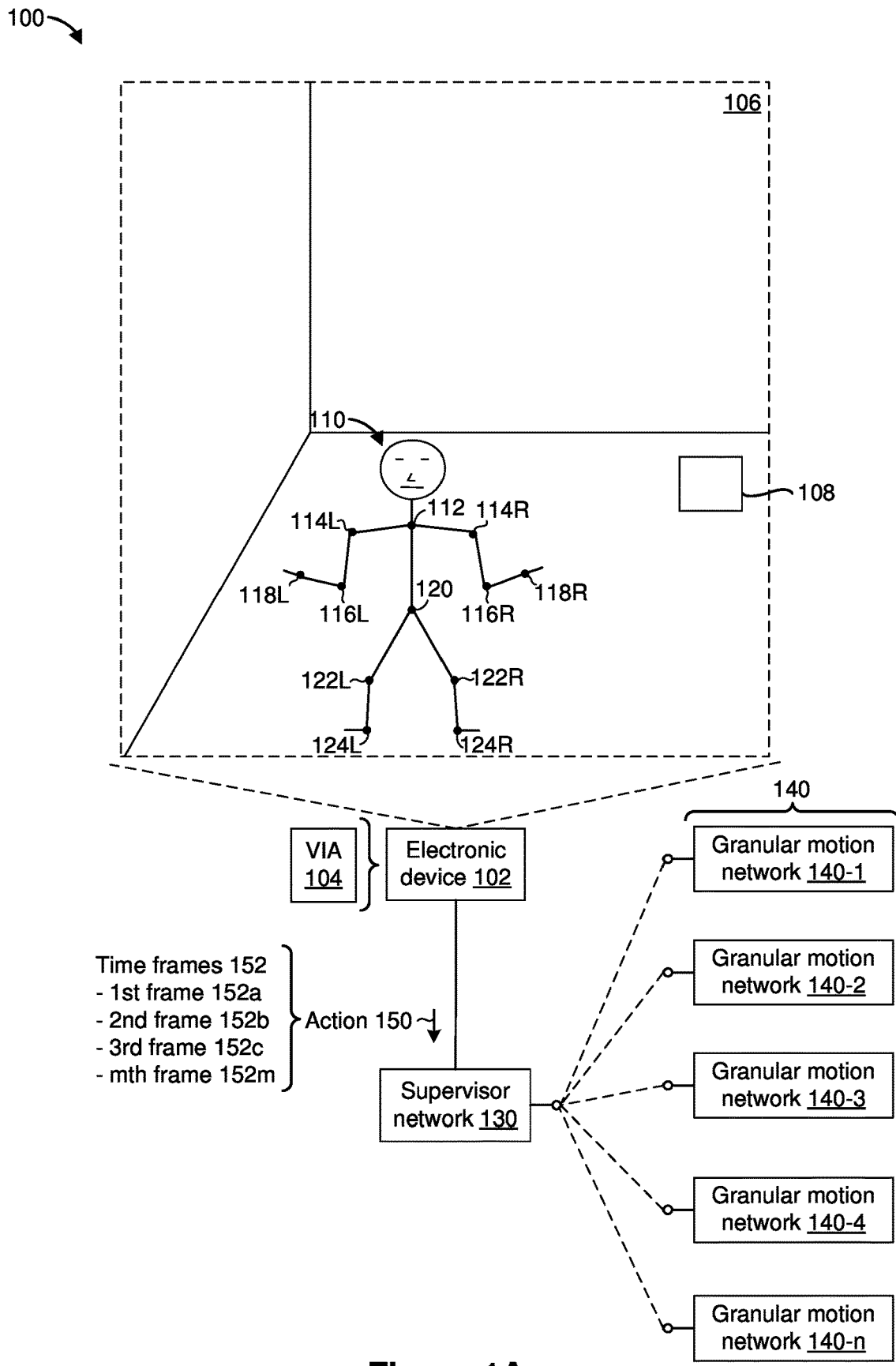
FIGS. 1A-1I are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for granular motion control for a virtual agent. In various implementations, a device includes a non-transitory memory and one or more processors coupled with the non-transitory memory. In some implementations, a method includes obtaining an action for a virtual agent. In some implementations, the action is associated with a plurality of time frames. In some implementations, the method includes, for a first time frame of the plurality of time frames, determining respective confidence scores for a plurality of granular motions that advance the virtual agent towards completion of the action. In some implementations, the method includes selecting a subset of the plurality of granular motions based on the respective confidence scores.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

A granular motion network for a particular granular motion provides torque values for virtual joints of an XR representation of a virtual agent. For example, if a first granular motion is lifting a leg of the virtual agent, then a first granular motion network provides a first set of torque values for a knee joint, a hip joint and an ankle joint of the virtual agent. Similarly, if a second granular motion is putting the leg down, then a second granular motion network provides a second set of torque values for the knee joint, the hip joint and the ankle joint. Granular motion networks may be trained to provide torque values that result in a motion that satisfies an action that includes multiple granular motions. For example, the first granular motion network for lifting the leg and the second granular motion network for putting the leg down may be separately trained to provide torque values that result in respective motions that satisfy a running action, a walking action, a jogging action and/or a jumping action. However, training the granular motion networks for each possible action that the virtual agent can exhibit is resource-intensive. In other words, training the granular motion networks for each possible action that the XR representation of the virtual agent can be animated to perform is resource-intensive.

The present disclosure provides methods, systems, and/or devices for granular motion control of a graphical representation (e.g., an XR representation) of a virtual agent. A supervisor network generates a sequence of granular motions for a virtual agent based on an action that is in a rendering pipeline of the virtual agent. The supervisor network obtains the action from the rendering pipeline of the virtual agent. The supervisor network selects a subset of available granular motions that are needed to exhibit the action. The supervisor network generates the sequence by ordering of the granular motions in the subset in order to advance the virtual agent towards completing the action. Animating the XR representation of the virtual agent to perform the subset of the granular motions in the particular order results in the XR representation of the virtual agent advancing towards completion of the action.

The action is to be completed in a number of time frames associated with the action. For a particular time frame, the supervisor network determines respective confidence scores for the available granular motions. The confidence score assigned to a particular granular motion indicates a likelihood of that particular granular motion advancing the XR representation of the virtual agent towards completion of the action. For example, if the action is climbing a ladder within ten seconds, then the supervisor network determines respective confidence scores for various available granular motions for each hundred millisecond period. For example, the supervisor network determines respective confidence scores for lifting a leg, putting the leg down, lifting an arm, curling fingers to form a fist, etc. For each time frame, the supervisor network selects one or more of the available granular motions based on the respective confidence scores of the available granular motions.

The supervisor network may utilize a forecasting window to determine the respective confidence scores for the available granular motions. The supervisor network determines the confidence scores by evaluating an effect of a granular motion selected for a current time frame on granular motions available for future time frames. For example, if animating the XR representation of the virtual agent to exhibit a particular granular motion during a current time frame results in other granular motions not being available in a subsequent time frame, then the supervisor network assigns a relatively low confidence score to that particular granular motion.

Allowing the supervisor network to select a subset of available granular motions for each time frame reduces the need to train each granular motion network for every possible action that the XR representation of the virtual agent can be manipulated to exhibit. Since training granular motion networks is resource-intensive, the supervisor network conserves computing resources by reducing a utilization of the computing resources.

FIG. 1A is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes an electronic device 102. In some implementations, the electronic device 102 includes a handheld computing device that can be held by a user (not shown). For example, in some implementations, the electronic device 102 includes a smartphone, a tablet, a media player, a laptop, or the like. In some implementations, the electronic device 102 includes a wearable computing device that can be worn by the user. For example, in some implementations, the electronic device 102 includes a head-mountable device (HMD), or an electronic watch. In some implementations, the electronic device 102 includes an HMD that is shaped to form a receptacle that receives a device with a display (e.g., the device with the display can be slid into the HMD to serve as a display for the HMD). Alternatively, in some implementations, the electronic device 102 includes an HMD that includes an integrated display.

In various implementations, the electronic device 102 includes a virtual intelligent agent (VIA) 104. In various implementations, the VIA 104 performs an action in order to satisfy (e.g., complete or achieve) an objective of the VIA 104. In various implementations, the VIA 104 obtains the objective from a human operator (e.g., a user of the electronic device 102). For example, in some implementations, the VIA 104 generates responses to queries that the user of the electronic device 102 inputs into the electronic device 102. In some implementations, the VIA 104 synthesizes vocal responses to voice queries that the electronic device 102 detects. In various implementations, the VIA 104 performs electronic operations on the electronic device 102. For example, the VIA 104 composes messages in response to receiving an instruction from the user of the electronic device 102. In some implementations, the VIA 104 schedules calendar events, sets timers/alarms, provides navigation directions, reads incoming messages, and/or assists the user in operating the electronic device 102. In some implementations, the VIA 104 is referred to as a virtual agent for the sake of brevity.

As illustrated in FIG. 1A, the electronic device 102 presents an extended reality (XR) environment 106. In some implementations, the XR environment 106 is generated by the electronic device 102. In some implementations, the XR environment 106 includes a virtual environment that is a simulated replacement of a physical environment. In other words, in some implementations, the XR environment 106 is synthesized by the electronic device 102. In such implementations, the XR environment 106 is different from the physical environment where the electronic device 102 is located. In some implementations, the XR environment 106 includes an augmented environment that is a modified version of a physical environment. For example, in some implementations, the electronic device 102 modifies (e.g., augments) the physical environment where the electronic device 102 is located in order to generate the XR environment 106. In some implementations, the electronic device 102 generates the XR environment 106 by simulating a replica of the physical environment where the electronic device 102 is located. In some implementations, the electronic device 102 generates the XR environment 106 by removing and/or adding items from the simulated replica of the physical environment where the electronic device 102 is located. In some implementations, the XR environment 106 is referred to as a graphical environment.

In some implementations, the XR environment 106 includes various XR objects. In the example of FIG. 1A, the XR environment 106 includes an XR box 108. In some implementations, the XR environment 106 includes XR representations of one or more virtual agents. In the example of FIG. 1A, the XR environment 106 includes an XR representation 110 of the VIA 104. In some implementations, the XR representation 110 of the VIA 104 is referred to as an avatar of the VIA 104. In some implementations, the XR objects are referred to as graphical objects.

In the example of FIG. 1A, the XR representation 110 of the VIA 104 includes an XR human. In some implementations, a user of the electronic device 102 selects the XR representation 110 for the VIA 104 from a set of available XR representations. In various implementations, the XR representation 110 of the VIA 104 is customizable. For example, in some implementations, the XR representation 110 of the VIA 104 includes an XR dog, an XR robot, etc.

In various implementations, the electronic device 102 animates the XR representation 110 of the VIA 104 to provide an appearance that the XR representation 110 of the VIA 104 is performing an action 150 within the XR environment 106 in order to satisfy (e.g., complete or achieve) an objective of the VIA 104. In various implementations, the VIA 104 generates the action 150 based on the objective of the VIA 104. In some implementations, the VIA 104 obtains the objective from a human operator (e.g., a user of the electronic device 102). In some implementations, the XR representation 110 of the VIA 104 obtains the objective from an XR representation of the human operator. For example, an XR representation of the human operator instructs the XR representation 110 of the VIA 104 to perform an action in the XR environment 106.

In various implementations, the VIA 104 performs an action or causes performance of the action by manipulating the XR representation 110 of the VIA 104 in the XR environment 106. In some implementations, the XR representation 110 of the VIA 104 is able to perform XR actions that an XR representation of the human operator is incapable of performing. In some implementations, the XR representation 110 of the VIA 104 performs XR actions based on information that the VIA 104 obtains from a physical environment. For example, the XR representation 110 of the VIA 104 nudges an XR representation of the human operator when the VIA 104 detects ringing of a doorbell in the physical environment.

In some implementations, the VIA 104 represents a fictional entity (e.g., a fictional character) from a fictional material, such as a movie, a video game, a comic, and a novel. For example, in some implementations, the VIA 104 represents an action figure from a fictional comic. In some implementations, the VIA 104 represents an action figure from a fictional video game. In some implementations, the XR environment 106 includes XR representations of multiple VIAs that represent respective characters from different fictional materials (e.g., from different movies/games/comics/novels). In various implementations, the VIA 104 represents a physical article from a physical environment. For example, in some implementations, the VIA 104 represents an equipment (e.g., machinery such as a plane, a tank, a robot, a car, etc.).

In some implementations, the VIA 104 generates the action 150 such that the action 150 is within a degree of similarity to actions that the corresponding entity performs. In some implementations, the VIA 104 determines the action 150 by selecting the action 150 from a set of actions that the corresponding entity performs or is capable of performing. For example, if the VIA 104 represents an action figure that can fly, then the action 150 may include flying. In some implementations, the VIA 104 obtains the action 150. For example, in some implementations, the VIA 104 receives the action 150 from a remote server that determines (e.g., selects) the action 150. In some implementations, the VIA 104 retrieves the action 150 from a memory location. For example, in some implementations, the VIA 104 retrieves the action 150 from a rendering pipeline for the XR representation 110 of the VIA 104.

As illustrated in FIG. 1A, the XR representation 110 includes various joints. For example, the XR representation 110 includes a neck joint 112, a right shoulder joint 114R, a left shoulder joint 114L, a right elbow joint 116R, a left elbow joint 116L, a right wrist joint 118R, a left wrist joint 118L, a hip joint 120, a right knee joint 122R, a left knee joint 122L, a right ankle joint 124R and a left ankle joint 124L. The XR representation 110 may include additional joints that are not shown in FIG. 1A. For example, the XR representation 110 may include finger joints, toe joints, etc.

In some implementations, the action 150 is associated with a set of time frames 152 (e.g., a first time frame 152a, a second time frame 152b, a third time frame 152c, . . . , and an mth time frame 152m). In some implementations, the action 150 is to be completed within the set of time frames 152. In some implementations, each time frame in the set of time frames 152 corresponds to a unit of time (e.g., a second, a millisecond, a hundred microseconds, etc.).

In the example of FIGS. 1A-1H, the action 150 is for the XR representation 110 to pick up the XR box 108. In various implementations, performing the action 150 may include performing a sequence of granular motions. For example, the action 150 of picking up the XR box 108 may include repeatedly lifting the right leg, putting the right leg down, lifting the left leg and putting the left leg down until the XR representation 110 reaches the XR box 108. Once the XR representation 110 reaches the XR box 108, the VIA 104 can manipulate the XR representation 110 to perform the additional granular motions of bending down, grasping the XR box 108 and standing up in order to complete the action 150.

In various implementations, each granular motion is controlled by a corresponding granular motion network. The granular motion network provides torque values for joints of the XR representation 110. In the example of FIG. 1A, the operating environment 100 includes a first granular motion network 140-1, a second granular motion network 140-2, a third granular motion network 140-3, a fourth granular motion network 140-4, . . . , and an nth granular motion network 140-n (collectively referred to as granular motion networks 140). Although the granular motion networks 140 are shown as being separate from the electronic device 102, in some implementations, the granular motion networks 140 are implemented by the electronic device 102 (e.g., in some implementations, the electronic device 102 includes the granular motion networks 140).

Each of the granular motion networks 140 generates torque values for a respective granular motion. In the example of FIGS. 1A-1H, the first granular motion network 140-1 generates torque values for a putting leg down motion. The second granular motion network 140-2 generates torque values for a grasping motion, for example, for a motion that involves bringing arms close together. The third granular motion network 140-3 generates torque values for a lifting leg up motion. The fourth granular motion network 140-4 generates torque values for a bending down motion. The nth granular motion network 140-n generates torque values for a standing straight motion.

The operating environment 100 includes a supervisor network 130 that selects a granular motion for each time frame in the set of time frames 152. In some implementations, for each of the set of time frames 152, the supervisor network 130 determines respective confidence scores for granular motions that advance the VIA 104 towards completion of the action 150. In such implementations, the supervisor network 130 selects a subset of the granular motions based on the confidence scores. Although the supervisor network 130 is shown as being separate from the electronic device 102, in some implementations, the supervisor network 130 is implemented by the electronic device 102 (e.g., in some implementations, the electronic device 102 includes the granular motion networks 140).

Figure 1B:
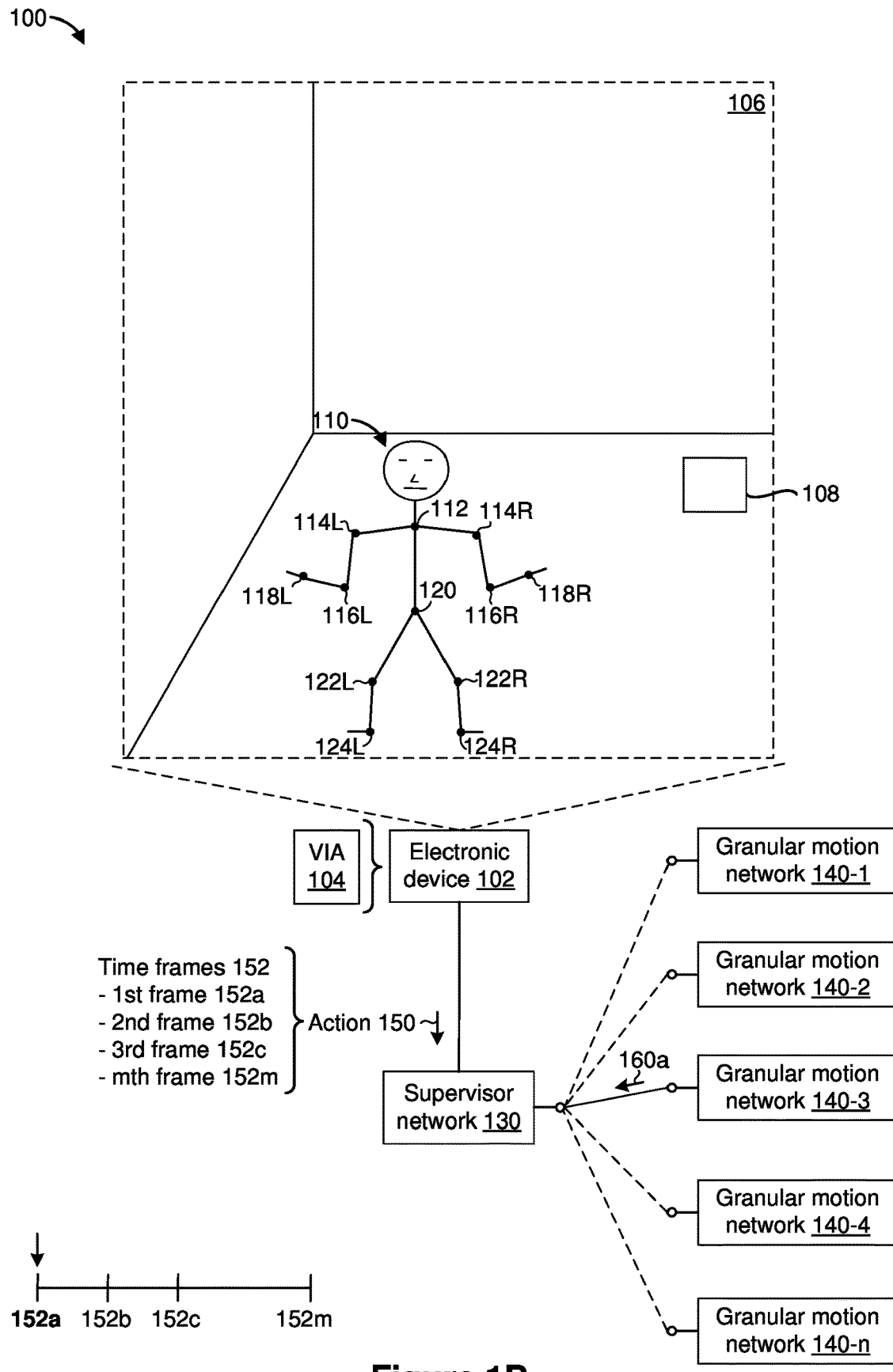

Referring to FIG. 1B, for the first time frame 152a, the supervisor network 130 selects the lifting leg up motion for the right leg of the XR representation 110. As such, the supervisor network 130 invokes the third granular motion network 140-3 that provides torque values for the lifting leg up motion. The third granular motion network 140-3 provides a first set of torque values 160a for lifting the right leg of the XR representation 110.

Figure 1C:
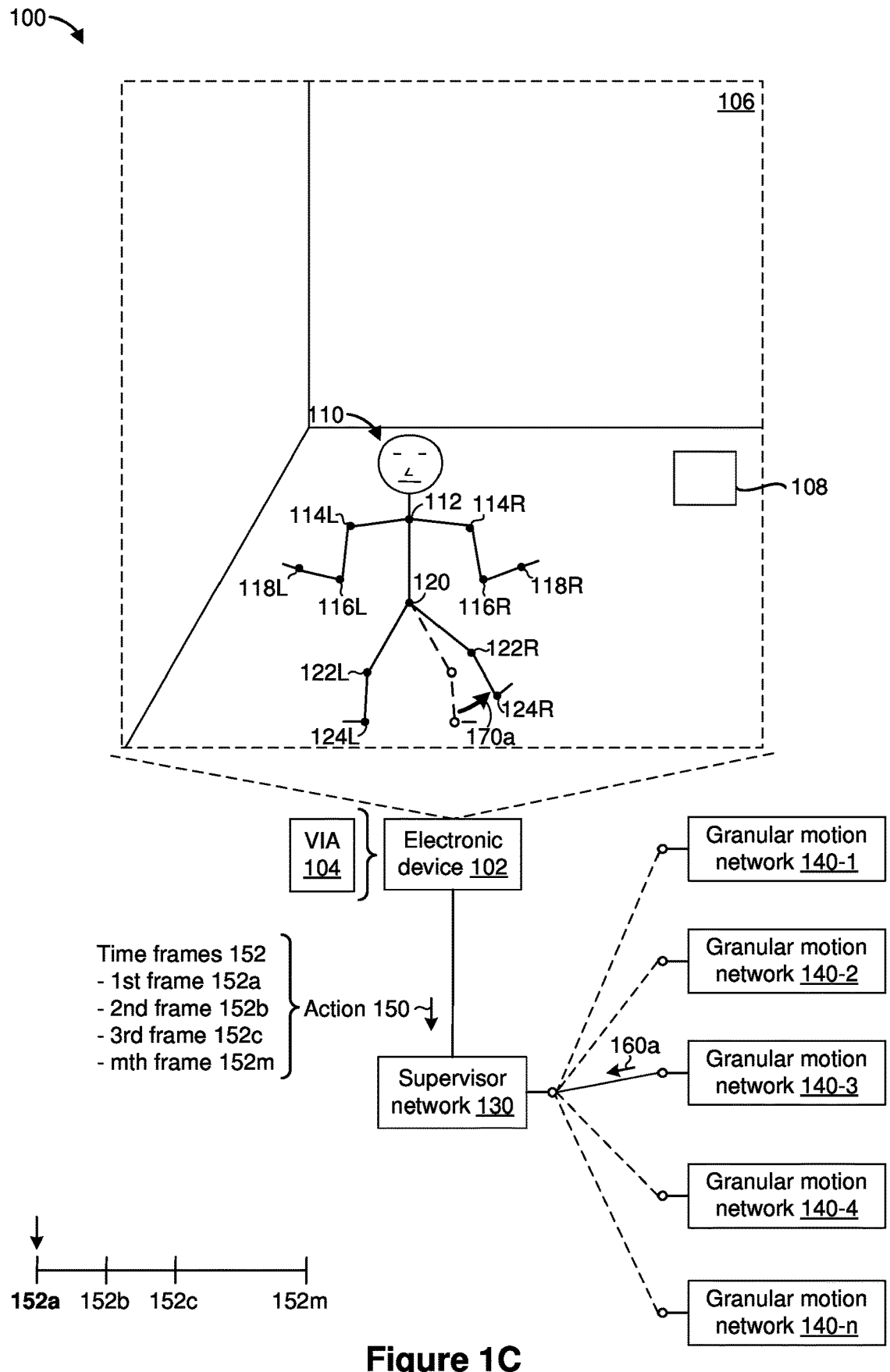

Referring to FIG. 1C, the electronic device 102 (e.g., the VIA 104) utilizes the first set of torque values 160a to animate the XR representation 110 in order to provide an appearance that the XR representation 110 is performing a first granular motion 170a of lifting the right leg. In the example of FIG. 1C, animating the XR representation 110 to exhibit the first granular motion 170a provides an appearance that the XR representation 110 has started walking towards the XR box 108 in order to complete the action 150 of lifting the XR box 108. FIG. 1C illustrates a previous position of the right leg by dashed lines. In some implementations, the first set of torque values 160a includes torque values for the hip joint 120, the right knee joint 122R and/or the right ankle joint 124R.

Figure 1D:
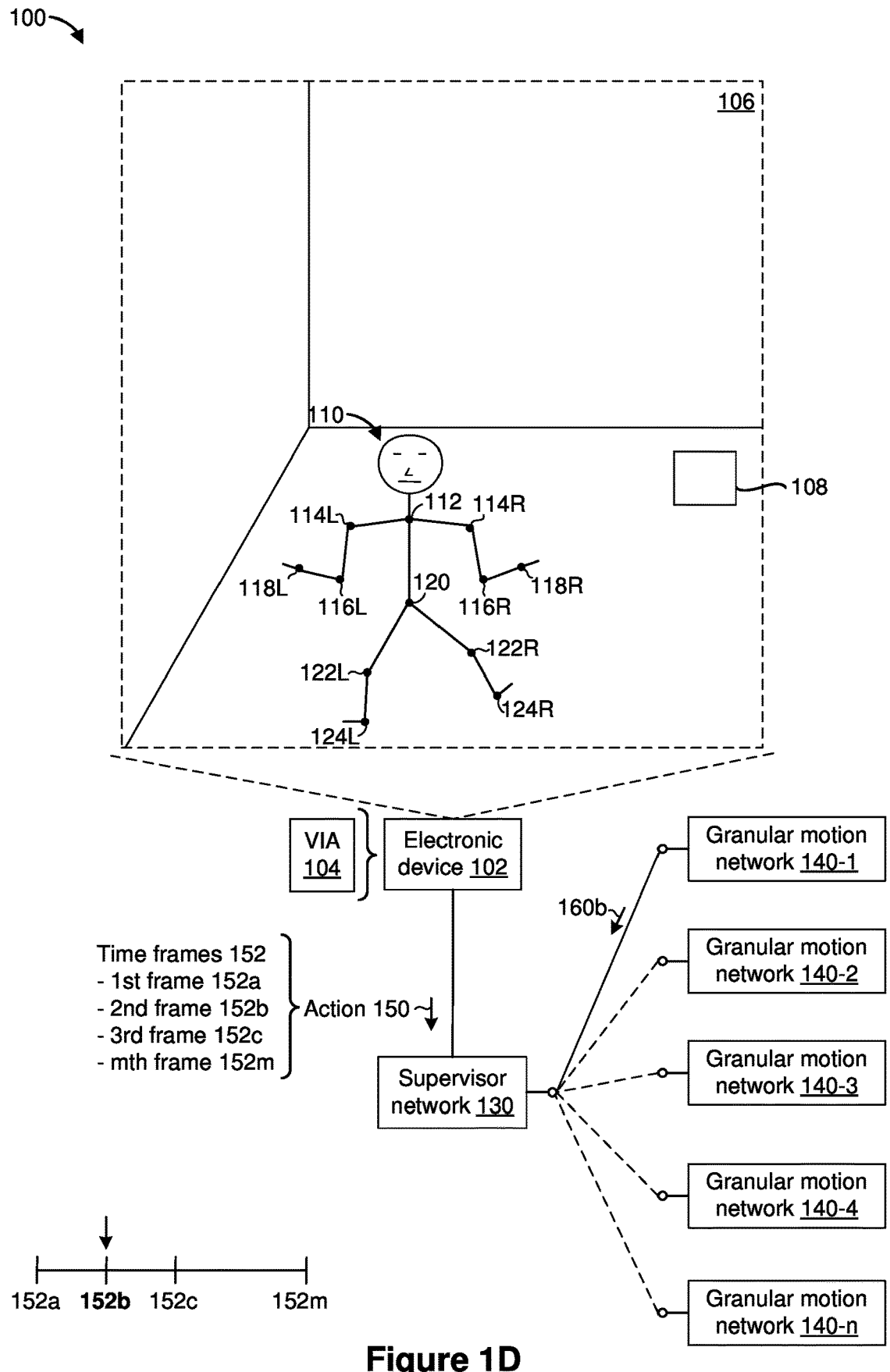

Referring to FIG. 1D, for the second time frame 152b, the supervisor network 130 selects the putting leg down motion for the right leg of the XR representation 110. As such, the supervisor network 130 invokes the first granular motion network 140-1 that provides torque values for the putting leg down motion. The first granular motion network 140-1 provides a second set of torque values 160b for putting the right leg down of the XR representation 110.

Figure 1E:
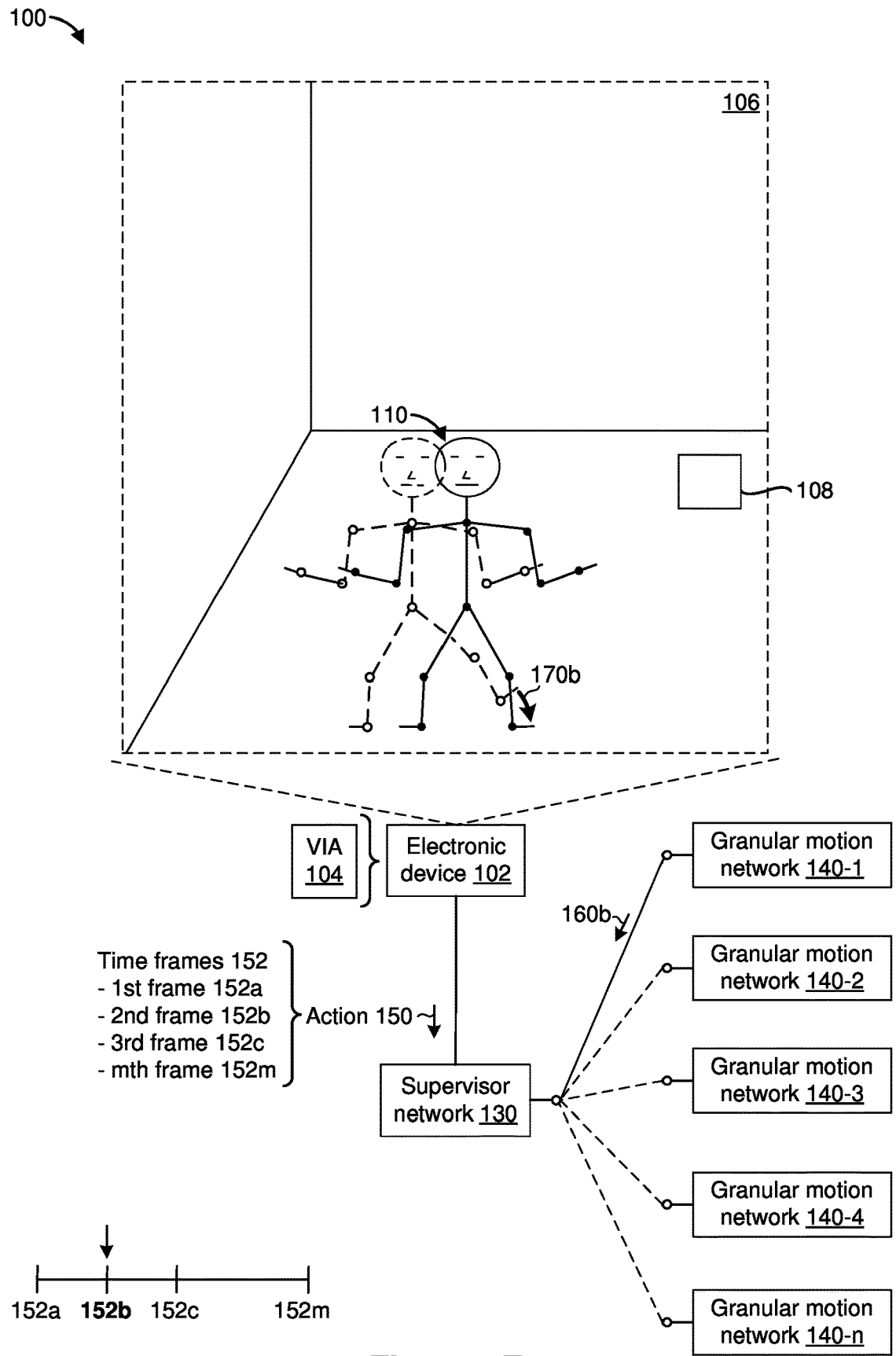

Referring to FIG. 1E, the electronic device 102 (e.g., the VIA 104) utilizes the second set of torque values 160b to animate the XR representation 110 in order to provide an appearance that the XR representation 110 is performing a second granular motion 170b of putting the right leg down. In the example of FIG. 1E, animating the XR representation 110 to exhibit the second granular motion 170b provides an appearance that the XR representation 110 has taken a step towards the XR box 108 in order to complete the action 150 of lifting the XR box 108. FIG. 1E illustrates a previous position of the XR representation 110 by dashed lines. In some implementations, the second set of torque values 160b includes torque values for the hip joint 120, the right knee joint 122R and/or the right ankle joint 124R.

Figure 1F:
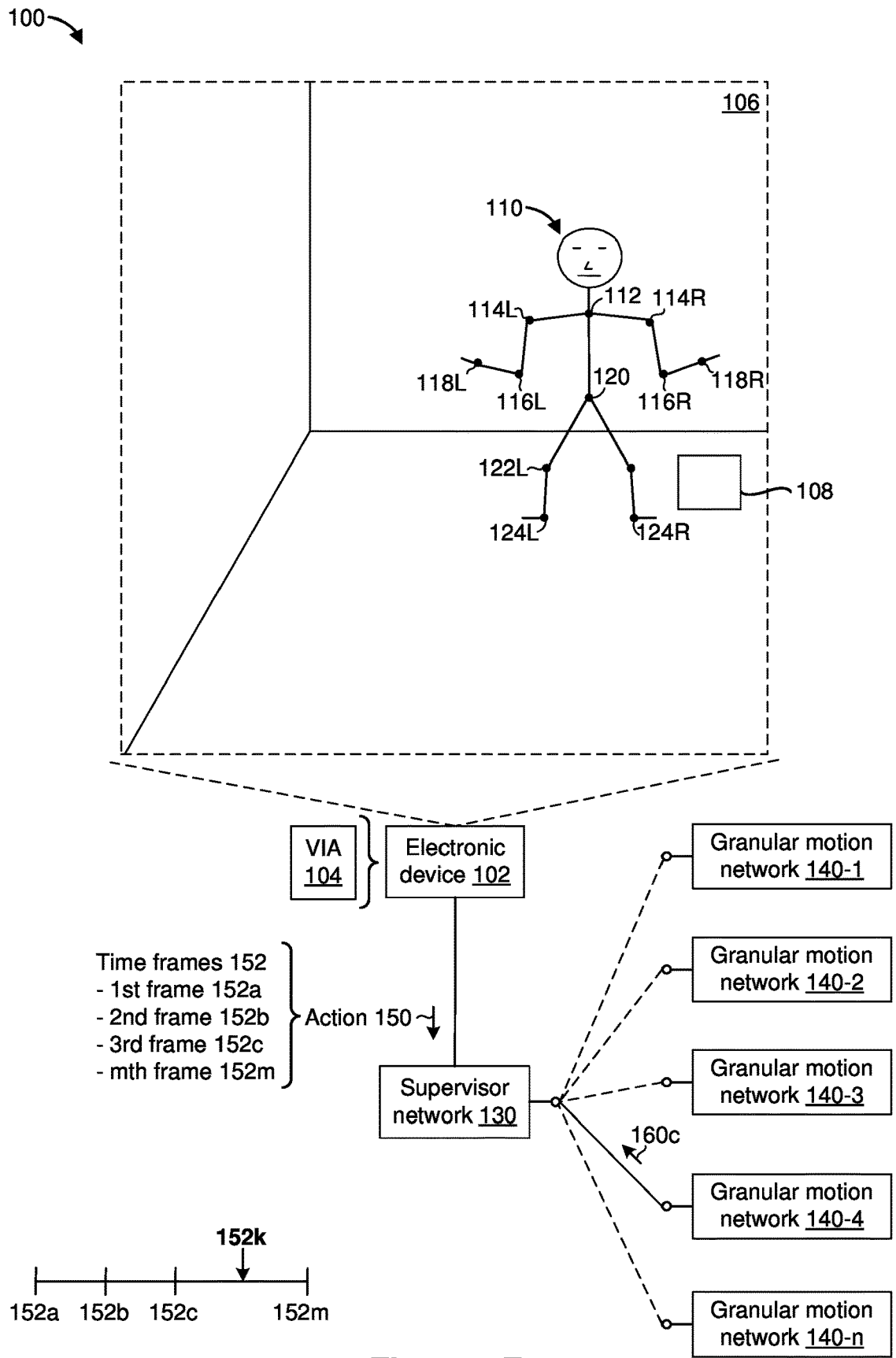

Referring to FIG. 1F, for a kth time frame 152k, the supervisor network 130 selects the bending down motion for the XR representation 110. As such, the supervisor network 130 invokes the fourth granular motion network 140-4 that provides torque values for the bending down motion. The fourth granular motion network 140-4 provides a third set of torque values 160c for the bending down motion for the XR representation 110.

Figure 1G:
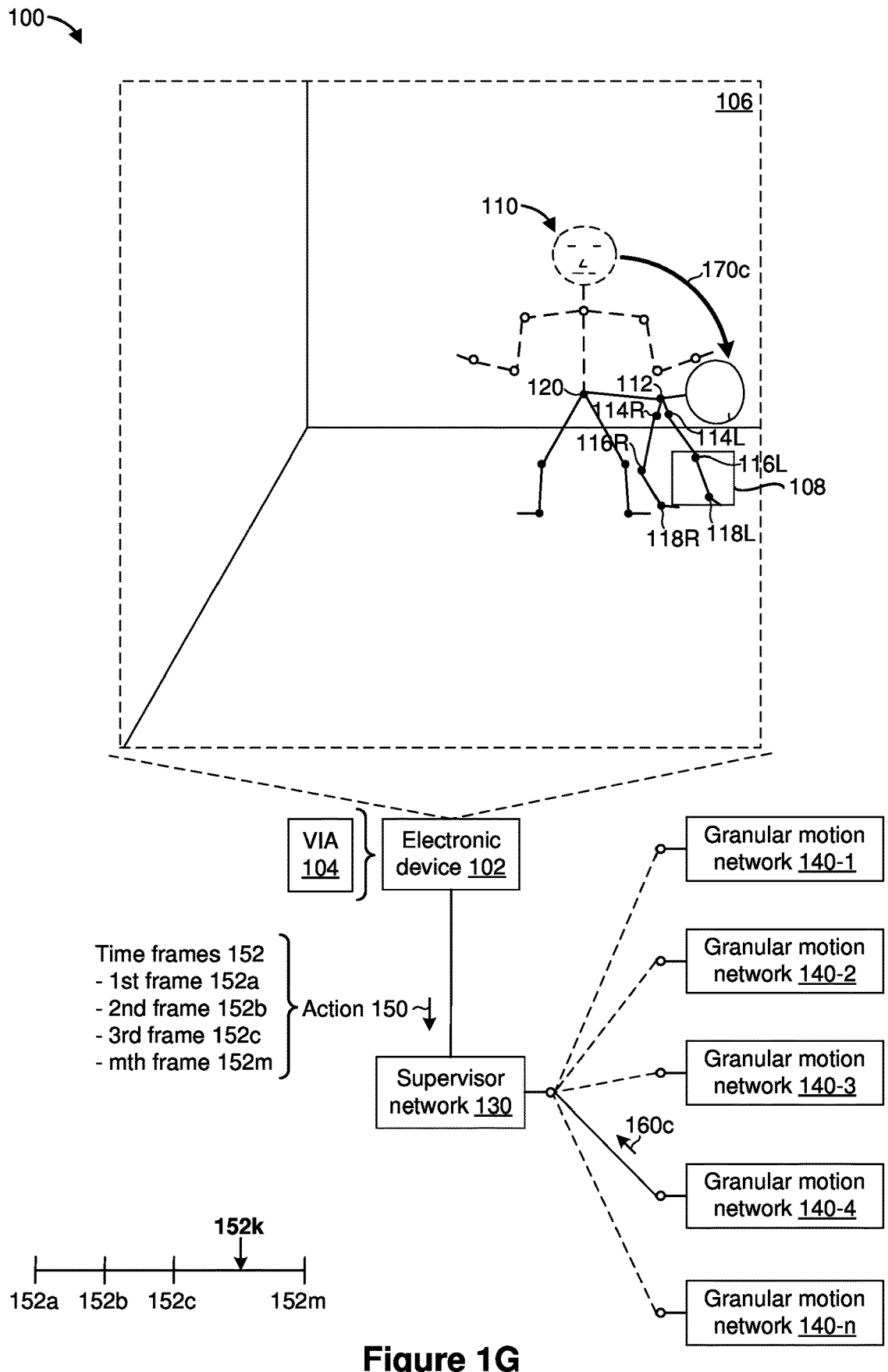

Referring to FIG. 1G, the electronic device 102 (e.g., the VIA 104) utilizes the third set of torque values 160c to animate the XR representation 110 in order to provide an appearance that the XR representation 110 is performing a third granular motion 170c of bending down. In the example of FIG. 1G, animating the XR representation 110 to exhibit the third granular motion 170c provides an appearance that the XR representation 110 has bent down towards the XR box 108 in order to complete the action 150 of lifting the XR box 108. FIG. 1G illustrates a previous position of the XR representation 110 by dashed lines. In some implementations, the third set of torque values 160c includes torque values for the neck joint 112, the right shoulder joint 114R, the left shoulder joint 114L, the right elbow joint 116R, the left elbow joint 116L, the right wrist joint 118R, the left wrist joint 118L and/or the hip joint 120.

Figure 1H:
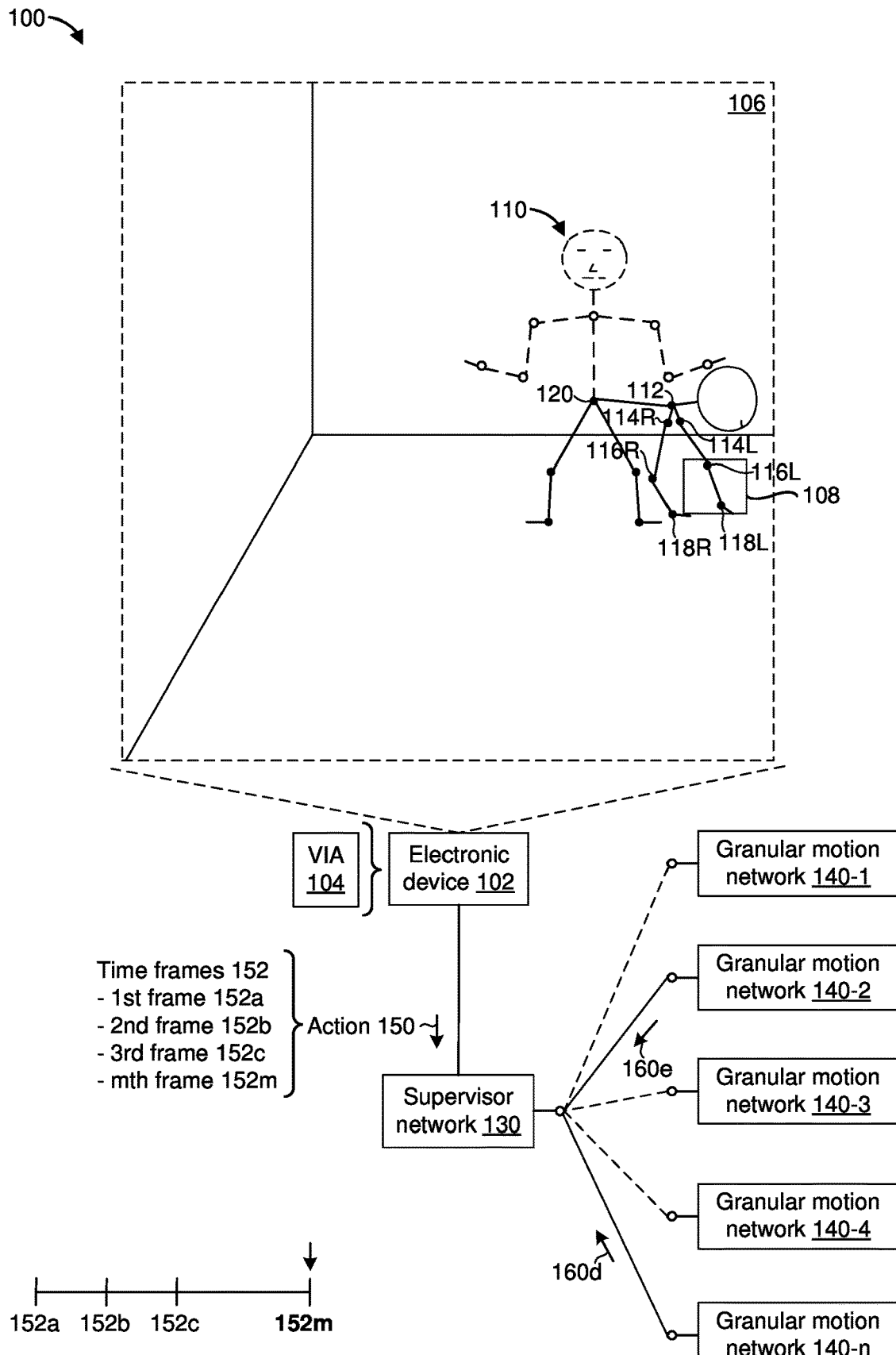

Referring to FIG. 1H, for the mth time frame 152m, the supervisor network 130 selects the grasping motion and the standing straight motion for the XR representation 110. As such, the supervisor network 130 invokes the second granular motion network 140-2 that provides torque values for the grasping motion and the nth granular motion network 140-n that provides torque values for the standing straight motion. The nth granular motion network 140-n provides a fourth set of torque values 160d for the standing straight motion for the XR representation 110. The second granular motion network 140-2 provides a fifth set of torque values 160e for the grasping motion for the XR representation 110.

Figure 1I:
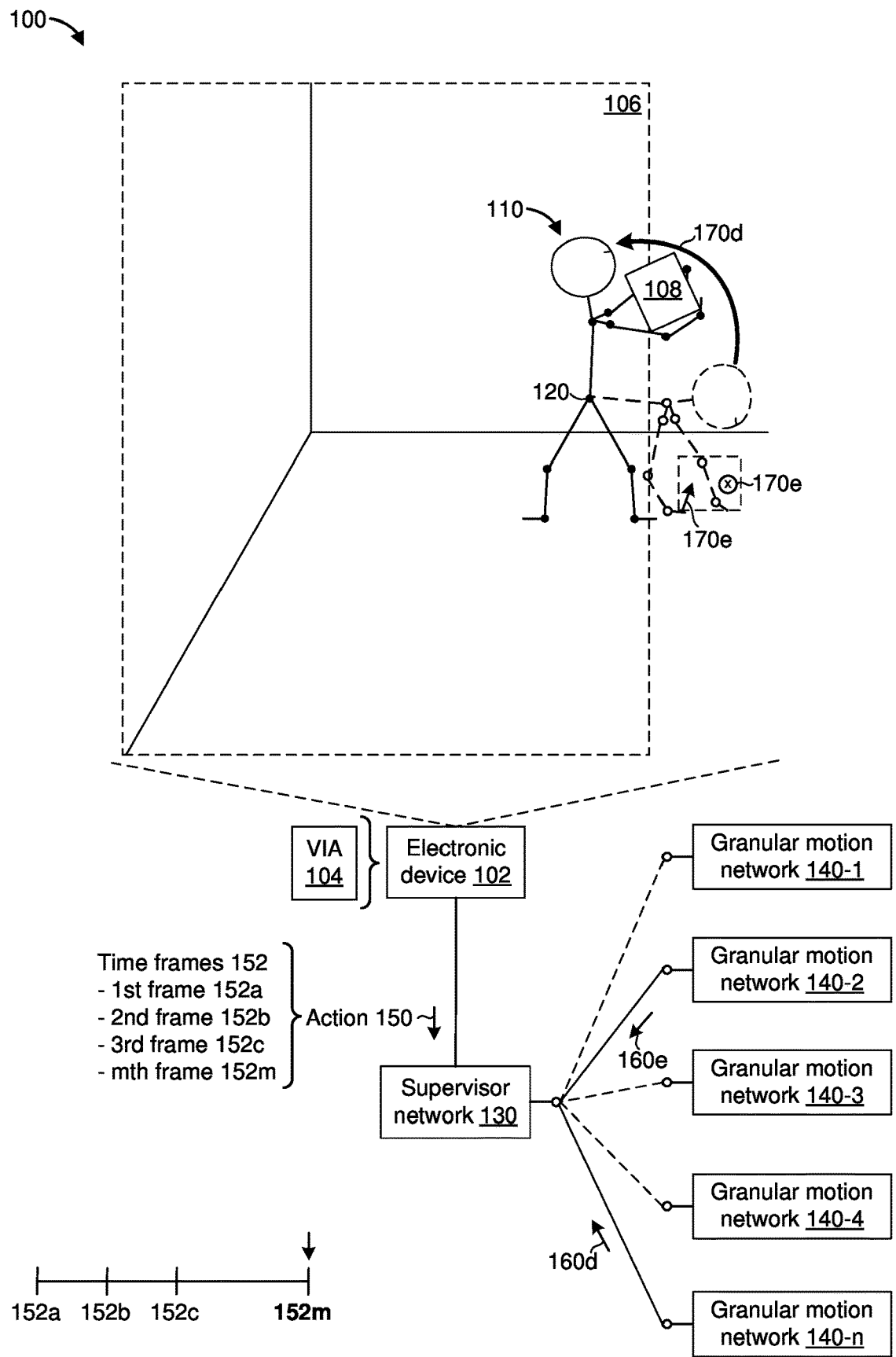

Referring to FIG. 1I, the electronic device 102 (e.g., the VIA 104) utilizes the fourth set of torque values 160d to animate the XR representation 110 in order to provide an appearance that the XR representation 110 is performing a fourth granular motion 170d of standing straight. The electronic device 102 concurrently utilizes the fifth set of torque values 160e to animate the XR representation 110 in order to provide an appearance that the XR representation 110 is performing a fifth granular motion 170e of grasping the XR box 108. The fifth granular motion 170e includes two components. As indicated by the encircled 'x' labeled with the reference numeral 170e, a right arm of the XR representation 110 is clenching the XR box 108, while a left arm of the XR representation 110 is applying a lift force to the XR box 108 (as indicated by the arrow indicative of the fifth granular motion 170e). In the example of FIG. 1I, animating the XR representation 110 to concurrently exhibit the fourth granular motion 170d and the fifth granular motion 170e provides an appearance that the XR representation 110 has stood up straight while holding onto the XR box 108 in order to complete the action 150 of lifting the XR box 108. FIG. 1I illustrates a previous position of the XR representation 110 by dashed lines. In some implementations, the fourth set of torque values 160d and/or the fifth set of torque values 160e include torque values for the neck joint 112, the right shoulder joint 114R, the left shoulder joint 114L, the right elbow joint 116R, the left elbow joint 116L, the right wrist joint 118R, the left wrist joint 118L and/or the hip joint 120.

While FIGS. 1C, 1E, 1G and 1I reference the first granular motion 170a, the second granular motion 170b, the third granular motion 170c, the fourth granular motion 170d and the fifth granular motion 170e, in various implementations, the electronic device 102 (e.g., the VIA 104) animates the XR representation 110 to exhibit additional granular motions such as an nth granular motion 170n. In some implementations, the first granular motion 170a, the second granular motion 170b, the third granular motion 170c, the fourth granular motion 170d, the fifth granular motion 170e, . . . , and the nth granular motion 170n are collectively referred to as granular motions 170.

Figure 2:
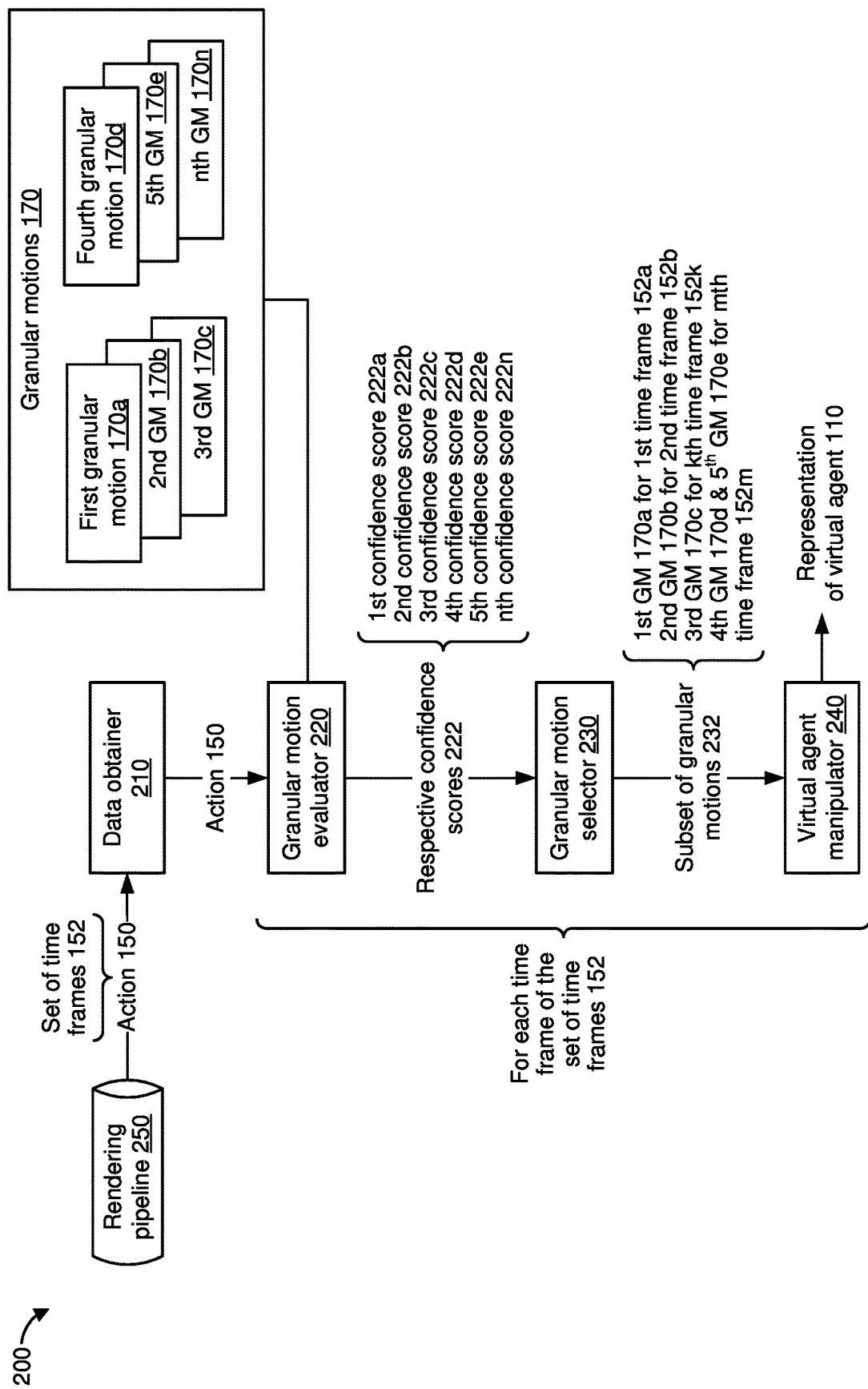
FIG. 2 is a block diagram of an example system in accordance with some implementations.

FIG. 2 is a block diagram of an example system 200 that provides granular motion control for a virtual agent. In various implementations, the system 200 includes a data obtainer 210, a granular motion evaluator 220, a granular motion selector 230, a virtual agent manipulator 240, and a rendering pipeline 250. In some implementations, the system 200 implements the supervisor network 130 shown in FIGS. 1A-1I.

In various implementations, the data obtainer 210 obtains the action 150. In some implementations, the data obtainer 210 retrieves the action 150 from the rendering pipeline 250. In some implementations, the rendering pipeline 250 stores actions that the XR representation 110 is to be animated to exhibit. More generally, in various implementations, the data obtainer 210 retrieves the action 150 from a memory location. The data obtainer 210 provides the action 150 to the granular motion evaluator 220.

In various implementations, for each of the set of time frames 152, the granular motion evaluator 220 evaluates the granular motions 170. In some implementations, the granular motion evaluator 220 generates respective confidence scores 222 for the granular motions 170. For example, in some implementations, the granular motion evaluator 220 generates a first confidence score 222a for the first granular motion 170a, a second confidence score 222b for the second granular motion 170b, a third confidence score 222c for the third granular motion 170c, a fourth confidence score 222d for the fourth granular motion 170d, a fifth confidence score 222e for the fifth granular motion 170e, . . . , and an nth confidence score 222n for the nth granular motion 170n. In some implementations, the granular motion evaluator 220 includes and/or utilizes a set of one or more neural network systems that generate the respective confidence scores 222 for the granular motions 170.

In some implementations, the confidence scores 222 indicate respective probabilities of the corresponding granular motions 170 advancing the XR representation 110 of the VIA 104 towards completion of the action 150. In some implementations, the confidence scores 222 include respective numerical values (e.g., a number between 0 and 1). In such implementations, a value closer to 1 indicates that the corresponding granular motion 170 is more likely to advance the XR representation 110 towards completion of the action 150 and a value closer to 0 indicates that the corresponding granular motion 170 is less likely to advance the XR representation 110 towards completion of the action 150. In some implementations, the confidence scores 222 include respective percentages (e.g., between 0% and 100%). In such implementations, a percentage closer to 100% indicates that the corresponding granular motion 170 is more likely to advance the XR representation 110 of the VIA 104 towards completion of the action 150 and a percentage closer to 0% indicates that the corresponding granular motion 170 is less likely to advance the XR representation 110 of the VIA 104 towards completion of the action 150.

In various implementations, the granular motion selector 230 selects a subset 232 of the granular motions 170 based on the respective confidence scores 222 for the granular motions 170. In some implementations, the granular motion selector 230 includes a number of granular motions 170 in the subset 232 in response to their respective confidence scores 222 satisfying (e.g., being greater than) a threshold confidence score. As such, in some implementations, the subset 232 includes multiple granular motions 170. In some implementations, the granular motion selector 230 selects one of the granular motions 170 with the highest confidence score 222. As such, in some implementations, the subset 232 includes a single granular motion.

As an example, the granular motion selector 230 selects the first granular motion 170a for the first time frame 152a (e.g., as illustrated in FIG. 1C). As another example, the granular motion selector 230 selects the second granular motion 170b for the second time frame 152b (e.g., as illustrated in FIG. 1E). As yet another example, the granular motion selector 230 selects the third granular motion 170c for the kth time frame 152k (e.g., as illustrated in FIG. 1G). As a further example, the granular motion selector 230 selects the fourth granular motion 170d and the fifth granular motion 170e for the mth time frame 152m (e.g., as illustrated in FIG. 1I).

In various implementations, the virtual agent manipulator 240 manipulates the XR representation 110 of the VIA 104 to exhibit the subset 232 of granular motions. For example, as shown in FIG. 1C, the virtual agent manipulator 240 manipulates the XR representation 110 of the VIA 104 to exhibit the first granular motion 170a during the first time frame 152a. As another example, the virtual agent manipulator 240 manipulates the XR representation 110 of the VIA 104 to exhibit the second granular motion 170b during the second time frame 152b (e.g., as illustrated in FIG. 1E). As yet another example, the virtual agent manipulator 240 manipulates the XR representation 110 of the VIA 104 to exhibit the third granular motion 170c during the kth time frame 152k (e.g., as illustrated in FIG. 1G). As a further example, the virtual agent manipulator 240 manipulates the XR representation 110 of the VIA 104 to exhibit the fourth granular motion 170d and the fifth granular motion 170e during the mth time frame 152m (e.g., as illustrated in FIG. 1I).

Figure 3A:
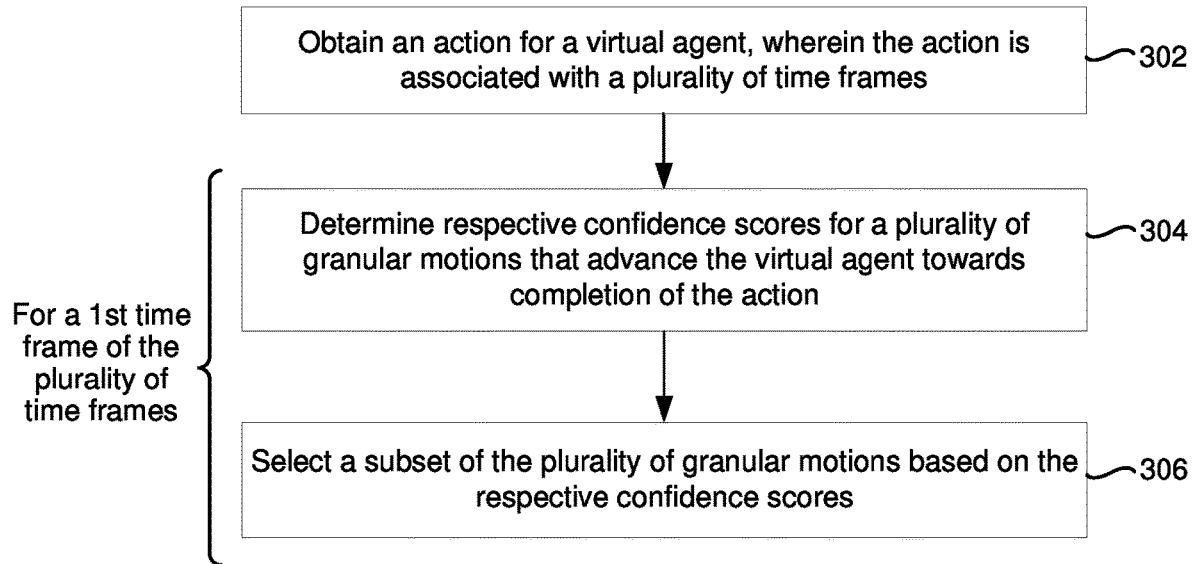

FIG. 3A is a flowchart representation of a method 300 of providing granular motion control for a virtual agent. In various implementations, the method 300 is performed by a device with a non-transitory memory and one or more processors coupled with the non-transitory memory (e.g., the electronic device 102 and/or the supervisor network 130 shown in FIGS. 1A-1I, and/or the system 200 shown in FIG. 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 302, in various implementations, the method 300 includes obtaining an action for a virtual agent. For example, as shown in FIG. 1A, the supervisor network 130 obtains the action 150 for the VIA 104. In some implementations, the method 300 includes retrieving the action from a memory location (e.g., from the rendering pipeline 250 shown in FIG. 2). In some implementations, the action is associated with a plurality of time frames. For example, as shown in FIG. 1A, the action 150 is associated with the set of time frames 152. In some implementations, the action is to be completed within the set of time frames.

As represented by block 304, in various implementations, the method 300 includes, for a first time frame of the plurality of time frames (e.g., for each time frame), determining respective confidence scores for a plurality of granular motions that advance the virtual agent towards completion of the action. For example, as shown in FIG. 2, the granular motion evaluator 220 determines the respective confidence scores 222 for the granular motions 170.

As represented by block 306, in various implementations, the method 300 includes selecting a subset of the plurality of granular motions based on the respective confidence scores. For example, as shown in FIG. 2, the granular motion selector 230 selects the subset 232 of the granular motions 170 based on the respective confidence scores 222 for the granular motions 170.

In various implementations, selecting the subset of the available granular motions reduces the need to train each granular motion network for every possible action that the XR representation of the virtual agent can be manipulated to exhibit. Since training granular motion networks is resource-intensive, selecting the subset of the available granular motions conserves computing resources by reducing a utilization of the computing resources.

Referring to FIG. 3B, as represented by block 308, in some implementations, the method 300 includes animating the virtual agent to exhibit the subset of the plurality of granular motions during the first time frame. For example, as described in relation to FIG. 2, the virtual agent manipulator 240 manipulates the XR representation 110 of the VIA 104 to exhibit the subset 232 of the granular motions 170. As an example, as shown in FIG. 1C, the electronic device 102 animates the XR representation 110 of the VIA 104 to exhibit the first granular motion 170a.

As represented by block 310, in some implementations, determining the respective confidence scores includes forecasting respective effects of the plurality of granular motions on a number of subsequent time frames, and determining the respective confidence scores based on the respective effects. For example, in some implementations, the granular motion evaluator 220 (shown in FIG. 2) evaluates the effect of each granular motion 170 on a forecasting window that spans a number of time frames past a current time frame for which the granular motion evaluator 220 is evaluating the granular motions 170.

As represented by block 312, in some implementations, forecasting the respective effects includes determining whether at least one of the plurality of granular motions is available for selection during each of the number of subsequent time frames. For example, in some implementations, the granular motion evaluator 220 assigns a relatively lower confidence score 222 to a granular motion 170 that results in no other granular motions 170 being available for selecting during a subsequent time frame.

As represented by block 314, in some implementations, determining the respective confidence scores includes determining respective probabilities of advancing towards completion of the action. For example, in some implementations, the first confidence score 222a (shown in FIG. 2) indicates a probability of the first granular motion 170a advancing the XR representation 110 of the VIA 104 towards completion of the action 150.

As represented by block 316, in some implementations, selecting the subset includes selecting, from the plurality of granular motions, a set of one or more granular motions with confidence scores that satisfy a threshold. In some implementations, the method 300 includes selecting a granular motion with a confidence score that is greater than the threshold. In some implementations, the method 300 includes selecting a granular motion with a probability greater than a threshold percentage (e.g., selecting granular motions that have a probability greater than 90%).

As represented by block 318, in some implementations, the determining and the selecting are performed by a supervisor network that controls respective granular motion networks corresponding to the plurality of granular motions. For example, in some implementations, the supervisor network 130 (shown in FIGS. 1A-1I) determines the respective confidence scores 222 (shown in FIG. 2) and selects the subset 232 of granular motions 170.

As represented by block 320, in some implementations, the method 300 includes training the supervisor network independent of the granular motion networks. For example, in some implementations, the supervisor network 130 is trained independent of the granular motion networks 140. In some implementations, training the supervisor network 130 independent of the granular motion networks 140 utilizes fewer computing resources thereby enhancing operability of the device.

As represented by block 322, in some implementations, the method 300 includes utilizing reinforcement learning to train the supervisor network. For example, in some implementations, the supervisor network 130 (shown in FIGS. 1A-1I) is trained via reinforcement learning. In some implementations, the supervisor network is trained using one or more methods associated with training neural network systems.

As represented by block 324, in some implementations, training the supervisor network includes concurrently training the supervisor network in two or more environments. In some implementations, the supervisor network 130 is concurrently trained for two or more XR environments. In some implementations, concurrently training the supervisor network in multiple environments tends to reduce an amount of time required to train the supervisor network.

As represented by block 326, in some implementations, the method 300 includes training the granular motion networks independent of the supervisor network. In some implementations, the granular motion networks 140 are trained independent of the supervisor network 130. Training the granular motion networks 140 independent of the supervisor network 130 reduces the need to train the granular motion networks 140 for every possible action that the XR representation 110 of the VIA 104 can exhibit thereby conserving scarce computing resources.

Referring to FIG. 3C, as represented by block 328, in some implementations, the method 300 includes, for each granular motion in the subset, obtaining joint movement values from a corresponding granular motion network, and applying the joint movement values to virtual joints of the virtual agent in order to exhibit the granular motion. For example, in the example of FIG. 1C, the third granular motion network 140-3 provides the first set of torque values 160a. The electronic device 102 applies the first set of torque values 160a to the XR representation 110 of the VIA 104 in order to allow the XR representation 110 of the VIA 104 to exhibit the first granular motion 170a.

As represented by block 330, in some implementations, the method 300 includes providing current joint positions of the virtual joints to the corresponding granular motion network as an input, and receiving, from the corresponding granular motion network, the joint movement values as a function of the current joint positions of the virtual joints. In the example of FIG. 1C, the electronic device 102 may provide current joint positions of the hip joint 120, the right knee joint 122R, the right ankle joint 124R, the left knee joint 122L and the left ankle joint 124L to the third granular motion network 140-3. In the example of FIG. 1C, the third granular motion network 140-3 may determine the first set of torque values 160a based on the current joint positions of the hip joint 120, the right knee joint 122R, the right ankle joint 124R, the left knee joint 122L and the left ankle joint 124L.

As represented by block 332, in some implementations, the method 300 includes providing current joint trajectories of the virtual joints to the corresponding motion network as an input, and receiving, from the corresponding granular motion network, the joint movement values as a function of the current joint trajectories of the virtual joints. In the example of FIG. 1C, the electronic device 102 may provide current joint trajectories of the hip joint 120, the right knee joint 122R, the right ankle joint 124R, the left knee joint 122L and the left ankle joint 124L to the third granular motion network 140-3. In the example of FIG. 1C, the third granular motion network 140-3 may determine the first set of torque values 160a based on the current joint trajectories of the hip joint 120, the right knee joint 122R, the right ankle joint 124R, the left knee joint 122L and the left ankle joint 124L.

As represented by block 334, in some implementations, the joint movement values include torque values for the virtual joints of the virtual agent. For example, as shown in FIG. 1C, the third granular motion network 140-3 provides the first set of torque values 160a for the hip joint 120, the right knee joint 122R, the right ankle joint 124R, the left knee joint 122L and/or the left ankle joint 124L.

As represented by block 336, in some implementations, obtaining the action includes obtaining (e.g., retrieving) the action from a rendering pipeline of the virtual agent. For example, as shown in FIG. 2, the data obtainer 210 retrieves the action 150 from the rendering pipeline 250. More generally, in various implementations, the method 300 includes retrieving the action from a memory location.

Figure 4:
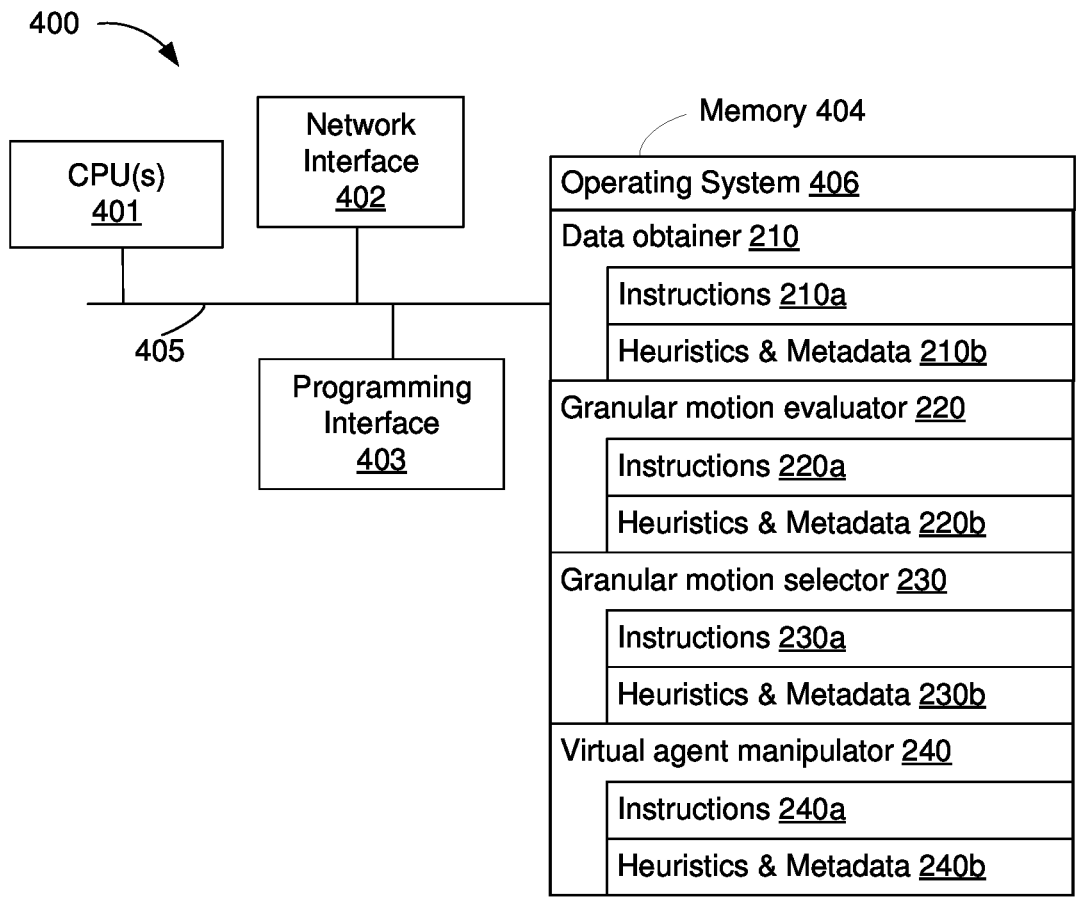
FIG. 4 is a block diagram of a device that provides granular motion control for a virtual agent in accordance with some implementations.

FIG. 4 is a block diagram of a device 400 that provides granular motion control for a virtual agent in accordance with some implementations. In some implementations, the device 400 implements the electronic device 102 shown in FIGS. 1A-1I and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the granular motion evaluator 220, the granular motion selector 230, and the virtual agent manipulator 240. In various implementations, the device 400 performs the method 300 shown in FIGS. 3A-3C.

In some implementations, the data obtainer 210 obtains an action for a virtual agent. In some implementations, the data obtainer 210 performs the operation(s) represented by block 302 in FIG. 3A. To that end, the data obtainer 210 includes instructions 210a, and heuristics and metadata 210b.

In some implementations, the granular motion evaluator 220 determines respective confidence scores for a plurality of granular motions. In some implementations, the granular motion evaluator 220 performs the operations(s) represented by block 304 shown in FIG. 3A. To that end, the granular motion evaluator 220 includes instructions 220a, and heuristics and metadata 220b.

In some implementations, the granular motion selector 230 selects a subset of the plurality of granular motions based on the respective confidence scores. In some implementations, the granular motion selector 230 performs the operation represented by block 306 shown in FIG. 3A. To that end, the granular motion selector 230 includes instructions 230a, and heuristics and metadata 230b.

In some implementations, the virtual agent manipulator 240 manipulates an XR representation of the virtual agent to exhibit the subset of the plurality of granular motions. To that end, the virtual agent manipulator 240 includes instructions 240a, and heuristics and metadata 240b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory and one or more processors coupled with the non-transitory memory:
obtaining an action for a virtual agent, wherein the action is associated with a plurality of time frames; and
for a first time frame of the plurality of time frames:
determining respective confidence scores for a plurality of granular motions that advance the virtual agent towards completion of the action;
selecting a subset of the plurality of granular motions comprising fewer than the entirety of the plurality of granular motions to be exhibited by a representation of the virtual agent based on the respective confidence scores; and
animating the representation of the virtual agent in accordance with the selected subset of the plurality of granular motions.

2. The method of claim 1, wherein a confidence score for a granular motion comprises a value indicating a probability that the granular motion will advance the virtual agent towards completion of the action.

3. The method of claim 1, wherein determining the respective confidence scores comprises:
forecasting respective effects of the plurality of granular motions on a number of subsequent time frames; and
determining the respective confidence scores based on the respective effects.

4. The method of claim 3, wherein forecasting the respective effects comprises:
determining whether at least one of the plurality of granular motions is available for selection during each of the number of subsequent time frames.

5. The method of claim 1, wherein determining the respective confidence scores comprises:
determining respective probabilities of advancing the virtual agent towards completion of the action.

6. The method of claim 1, wherein selecting the subset comprises:
selecting, from the plurality of granular motions, a set of one or more granular motions with confidence scores that satisfy a threshold.

7. The method of claim 1, wherein the determining and the selecting are performed by a supervisor network that controls respective granular motion networks corresponding to the plurality of granular motions.

8. The method of claim 7, further comprising:
training the supervisor network independent of the granular motion networks.

9. The method of claim 8, further comprising:
utilizing reinforcement learning to train the supervisor network.

10. The method of claim 8, wherein training the supervisor network comprises:
concurrently training the supervisor network in two or more environments.

11. The method of claim 7, further comprising:
training the granular motion networks independent of the supervisor network.

12. The method of claim 2, further comprising:
for each granular motion in the subset:
obtaining joint movement values from a corresponding granular motion network; and
applying the joint movement values to virtual joints of the representation of the virtual agent in order to exhibit the granular motion.

13. The method of claim 12, further comprising:
providing current joint positions of the virtual joints to the corresponding granular motion network as an input; and
receiving, from the corresponding granular motion network, the joint movement values as a function of the current joint positions of the virtual joints.

14. The method of claim 12, further comprising:
providing current joint trajectories of the virtual joints to the corresponding motion network as an input; and
receiving, from the corresponding granular motion network, the joint movement values as a function of the current joint trajectories of the virtual joints.

15. The method of claim 12, wherein the joint movement values include torque values for the virtual joints of the virtual agent.

16. The method of claim 1, wherein obtaining the action comprises:
retrieving the action from a rendering pipeline of the virtual agent.

17. A device comprising:
one or more processors;
a non-transitory memory;
one or more displays; and
one or more programs stored in the non-transitory memory, which, when executed by the one or more processors, cause the device to:
obtain an action for a virtual agent, wherein the action is associated with a plurality of time frames; and
for a first time frame of the plurality of time frames:
determine respective confidence scores for a plurality of granular motions that advance the virtual agent towards completion of the action;
select a subset of the plurality of granular motions comprising fewer than the entirety of the plurality of granular motions to be exhibited by a representation of the virtual agent based on the respective confidence scores; and
animate the representation of the virtual agent in accordance with the selected subset of the plurality of granular motions.

18. The device of claim 17, wherein a confidence score for a granular motion comprises a value indicating a probability that the granular motion will advance the virtual agent towards completion of the action.

19. The device of claim 17, wherein determining the respective confidence scores comprises:
forecasting respective effects of the plurality of granular motions on a number of subsequent time frames; and
determining the respective confidence scores based on the respective effects.

20. A non-transitory memory storing one or more programs, which, when executed by one or more processors of a device, cause the device to:
obtain an action for a virtual agent, wherein the action is associated with a plurality of time frames; and
for a first time frame of the plurality of time frames:
determine respective confidence scores for a plurality of granular motions that advance the virtual agent towards completion of the action;
select a subset of the plurality of granular motions comprising fewer than the plurality of granular motions to be exhibited by a representation of the virtual agent based on the respective confidence scores; and
animate the representation of the virtual agent in accordance with the selected subset of the plurality of granular motions.

21. The non-transitory memory of claim 20, wherein a confidence score for a granular motion comprises a value indicating a probability that the granular motion will advance the virtual agent towards completion of the action.

22. The non-transitory memory of claim 20, wherein determining the respective confidence scores comprises:
forecasting respective effects of the plurality of granular motions on a number of subsequent time frames; and
determining the respective confidence scores based on the respective effects.

23. The non-transitory memory of claim 20, wherein determining the respective confidence scores comprises:
determining respective probabilities of advancing the virtual agent towards completion of the action.

24. The non-transitory memory of claim 20, wherein selecting the subset comprises:
selecting, from the plurality of granular motions, a set of one or more granular motions with confidence scores that satisfy a threshold.

* * * * *